(12) United States Patent
Hetzroni et al.

(10) Patent No.: US 10,050,397 B1
(45) Date of Patent: Aug. 14, 2018

(54) MOUNT FOR A TOUCH-SCREEN DEVICE

(71) Applicants: Daniel Hetzroni, Hallandale Beach, FL (US); Guil Hetzroni, Coral Springs, FL (US)

(72) Inventors: Daniel Hetzroni, Hallandale Beach, FL (US); Guil Hetzroni, Coral Springs, FL (US)

( * ) Notice: Subject to any disclaimer, the term of this patent is extended or adjusted under 35 U.S.C. 154(b) by 0 days.

(21) Appl. No.: 15/632,940

(22) Filed: Jun. 26, 2017

(51) Int. Cl.
*H01R 33/06* (2006.01)
*G06F 1/16* (2006.01)
*H01R 33/945* (2006.01)

(52) U.S. Cl.
CPC ........... *H01R 33/06* (2013.01); *G06F 1/1632* (2013.01); *H01R 33/945* (2013.01); *G06F 1/1626* (2013.01); *G06F 1/1643* (2013.01)

(58) Field of Classification Search
CPC .................. H02J 7/0044; H01R 33/06
See application file for complete search history.

(56) References Cited

U.S. PATENT DOCUMENTS

| | | | | |
|---|---|---|---|---|
| 5,780,993 A * | 7/1998 | Tsang | ..................... | H02J 7/0042 320/111 |
| 6,034,505 A * | 3/2000 | Arthur | ................. | H01M 2/1022 320/113 |
| 6,091,611 A * | 7/2000 | Lanni | ..................... | H02J 7/0008 307/151 |
| 6,687,513 B1 * | 2/2004 | Hsu Li | ................ | B60R 11/0241 379/420.04 |
| 6,762,585 B2 * | 7/2004 | Liao | ....................... | H02J 7/0044 320/107 |
| 6,821,134 B2 * | 11/2004 | Chen | ....................... | H01R 35/04 439/11 |
| 6,831,848 B2 * | 12/2004 | Lanni | ...................... | H02J 7/022 307/38 |
| 7,868,589 B2 * | 1/2011 | McSweyn | ............. | H02J 7/0044 320/107 |
| 7,887,341 B2 * | 2/2011 | Liao | ....................... | H01R 13/60 439/131 |
| 7,889,498 B2 * | 2/2011 | Diebel | .................. | G06F 1/1628 361/679.41 |
| 8,074,951 B2 * | 12/2011 | Carnevali | ............... | B60R 11/02 108/143 |
| 8,229,501 B2 * | 7/2012 | Struthers | ................ | H04H 20/63 455/556.1 |
| 8,378,625 B2 * | 2/2013 | Gourley | .................... | H02J 5/00 320/107 |
| 8,415,920 B2 * | 4/2013 | Liao | ....................... | H02J 7/0042 16/225 |
| 8,456,131 B2 * | 6/2013 | Bukow | ................. | H02J 7/0044 320/110 |

(Continued)

*Primary Examiner* — Ross Gushi
(74) *Attorney, Agent, or Firm* — Laurence A. Greenberg; Werner H. Stemer; Ralph E. Locher

(57) ABSTRACT

A mount for mounting a touch screen device, such as a tablet computer, to an electrical outlet includes a base for rotatably mounting the touch screen device to the electrical outlet, an electrical plug to be plugged into the electrical outlet and a USB plug to be plugged into a port of the touch screen device. A cover covers at least edges of the touch screen device and the base and the cover hide the electrical outlet. The touch screen device is therefore permanently mounted to and powered by the electrical outlet, yet rotatable into horizontal or vertical positions.

7 Claims, 12 Drawing Sheets

(56) References Cited

U.S. PATENT DOCUMENTS

| | | | | |
|---|---|---|---|---|
| 8,545,260 B2* | 10/2013 | Zhou | H01R 13/72 | 191/12.4 |
| 8,686,683 B2* | 4/2014 | Caskey | H01R 13/6675 | 320/107 |
| 8,712,482 B2* | 4/2014 | Sorias | H02J 7/0042 | 455/572 |
| 8,712,486 B2* | 4/2014 | Sorias | H02J 7/0042 | 455/575.1 |
| 8,864,517 B2* | 10/2014 | Cohen | H01R 13/73 | 439/536 |
| 8,868,939 B2 | 10/2014 | Matsuoka et al. | | |
| 8,929,065 B2* | 1/2015 | Williams | G06F 1/1632 | 361/679.41 |
| 8,950,717 B2* | 2/2015 | Chuang | F16M 13/02 | 248/231.41 |
| 9,072,172 B2* | 6/2015 | Hsu | H05K 5/0086 | |
| 9,088,670 B2* | 7/2015 | Sorias | B25G 3/18 | |
| 9,122,449 B2* | 9/2015 | DeSilva | G06F 1/1632 | |
| 9,124,105 B2* | 9/2015 | Gunderman | H02J 7/0044 | |
| 9,130,332 B2* | 9/2015 | Yosef | H01R 31/06 | |
| 9,130,384 B2* | 9/2015 | Pliner | H02J 7/0042 | |
| 9,134,761 B2* | 9/2015 | Rajeswaran | G06F 1/1626 | |
| 9,148,030 B1* | 9/2015 | Johnson | H02J 7/0042 | |
| 9,153,986 B1 | 10/2015 | Herr et al. | | |
| 9,161,464 B2* | 10/2015 | Liao | H05K 5/0065 | |
| 9,231,410 B2* | 1/2016 | Wojcik | H05K 5/0086 | |
| 9,362,765 B1* | 6/2016 | Blaszczak | H01R 31/065 | |
| 9,413,179 B2* | 8/2016 | Sorias | H02J 7/0044 | |
| 9,438,298 B2* | 9/2016 | Abramovich | H04B 1/3888 | |
| 9,455,543 B2* | 9/2016 | Liao | H01R 31/065 | |
| 9,506,446 B2 | 11/2016 | Xinfang | | |
| 9,551,454 B2 | 1/2017 | Lipke et al. | | |
| 9,602,639 B2* | 3/2017 | Carnevali | H04M 1/0254 | |
| 9,614,569 B2* | 4/2017 | Alsberg | H04B 1/3888 | |
| 9,620,911 B2* | 4/2017 | Warren | H01R 13/6675 | |
| 9,627,802 B2* | 4/2017 | Warren | H01R 13/60 | |
| 9,632,535 B2* | 4/2017 | Carnevali | G06F 1/181 | |
| 9,706,026 B2* | 7/2017 | Carnevali | G06F 1/1628 | |
| 9,774,192 B2* | 9/2017 | Wojcik | H02J 4/00 | |
| 9,776,577 B2* | 10/2017 | Carnevali | B60R 11/02 | |
| 9,831,904 B1* | 11/2017 | Carnevali | H04B 1/3877 | |
| 2002/0043960 A1* | 4/2002 | Janik | G06F 1/1632 | 320/128 |
| 2003/0218445 A1* | 11/2003 | Behar | H02J 7/0044 | 320/114 |
| 2004/0121648 A1* | 6/2004 | Voros | H01R 13/6215 | 439/535 |
| 2005/0088141 A1* | 4/2005 | Lee | A45F 5/00 | 320/114 |
| 2005/0231159 A1* | 10/2005 | Jones, Sr. | H02J 7/0044 | 320/114 |
| 2006/0058073 A1* | 3/2006 | Kim | H02J 7/0044 | 455/573 |
| 2007/0152633 A1* | 7/2007 | Lee | G06F 1/1632 | 320/114 |
| 2007/0285053 A1* | 12/2007 | Noguchi | H02J 7/32 | 320/114 |
| 2008/0012536 A1* | 1/2008 | Glass | H02J 7/0027 | 320/165 |
| 2008/0157712 A1* | 7/2008 | Garcia | H02J 7/0044 | 320/101 |
| 2008/0157715 A1* | 7/2008 | Rosenboom | H02J 7/0044 | 320/108 |
| 2008/0203260 A1* | 8/2008 | Carnevali | B60R 11/0241 | 248/316.5 |
| 2008/0278113 A1* | 11/2008 | Fan | H02J 7/0044 | 320/113 |
| 2009/0015192 A1* | 1/2009 | Sheu | A45C 11/00 | 320/103 |
| 2009/0015198 A1* | 1/2009 | Brandenburg | H02J 7/0044 | 320/115 |
| 2009/0237031 A1* | 9/2009 | McSweyn | H02J 7/0044 | 320/114 |
| 2009/0314400 A1* | 12/2009 | Liu | A45C 11/00 | 150/165 |
| 2010/0315036 A1* | 12/2010 | Liao | H01R 31/065 | 320/107 |
| 2011/0062299 A1* | 3/2011 | Tsai | F16M 11/041 | 248/231.41 |
| 2011/0084651 A1* | 4/2011 | Caskey | H01R 25/006 | 320/107 |
| 2011/0159930 A1* | 6/2011 | Garrett | H04M 1/21 | 455/573 |
| 2011/0187323 A1* | 8/2011 | Gourley | H02J 5/00 | 320/111 |
| 2011/0227535 A1* | 9/2011 | Caskey | H01R 13/6675 | 320/111 |
| 2011/0287665 A1* | 11/2011 | Chien | F21S 8/035 | 439/638 |
| 2012/0025684 A1* | 2/2012 | Trotsky | F16M 11/043 | 312/334.1 |
| 2012/0043235 A1* | 2/2012 | Klement | A45C 11/00 | 206/320 |
| 2012/0049800 A1* | 3/2012 | Johnson | H02J 7/0044 | 320/111 |
| 2012/0092377 A1* | 4/2012 | Stein | F16M 11/041 | 345/649 |
| 2012/0111881 A1* | 5/2012 | Gaddis, II | G06F 1/1628 | 220/752 |
| 2012/0139484 A1 | 6/2012 | Gunderman et al. | | |
| 2012/0178506 A1* | 7/2012 | Sorias | H02J 7/0042 | 455/573 |
| 2012/0211382 A1* | 8/2012 | Rayner | G06F 1/1626 | 206/320 |
| 2012/0250270 A1* | 10/2012 | Liu | H04M 1/185 | 361/752 |
| 2012/0261306 A1* | 10/2012 | Richardson | G06F 1/1626 | 206/778 |
| 2012/0275107 A1* | 11/2012 | Enomoto | G06F 1/1632 | 361/679.41 |
| 2012/0298536 A1* | 11/2012 | Rauta | G06F 1/1656 | 206/301 |
| 2012/0319487 A1* | 12/2012 | Shah | H02J 7/0054 | 307/66 |
| 2013/0052871 A1* | 2/2013 | Eklind | H04M 1/04 | 439/620.21 |
| 2013/0057215 A1* | 3/2013 | Rajeswaran | G06F 1/1626 | 320/111 |
| 2013/0092576 A1* | 4/2013 | Rayner | G06F 1/1626 | 206/320 |
| 2013/0193006 A1* | 8/2013 | Bergreen | A45C 11/22 | 206/37 |
| 2013/0220841 A1* | 8/2013 | Yang | A45C 11/00 | 206/37 |
| 2013/0241489 A1* | 9/2013 | Ting | H02J 7/0044 | 320/111 |
| 2013/0258573 A1* | 10/2013 | Muday | G06F 1/1613 | 361/679.21 |
| 2013/0273983 A1* | 10/2013 | Hsu | H05K 5/0086 | 455/575.1 |
| 2013/0288743 A1* | 10/2013 | Hunt | F41G 11/004 | 455/556.1 |
| 2014/0097306 A1* | 4/2014 | Hale | F16M 13/022 | 248/122.1 |
| 2014/0191724 A1* | 7/2014 | Wojcik | H05K 5/0086 | 320/114 |
| 2014/0244882 A1* | 8/2014 | Struthers | H04H 20/63 | 710/303 |
| 2014/0253038 A1* | 9/2014 | Posa | H02J 7/0044 | 320/111 |
| 2014/0263931 A1* | 9/2014 | Chen | F16M 11/041 | 248/576 |
| 2014/0284226 A1* | 9/2014 | Chen | A45C 11/00 | 206/37 |
| 2014/0287801 A1* | 9/2014 | Ho | H04B 1/3883 | 455/573 |
| 2014/0292255 A1* | 10/2014 | Chu | H02J 7/0044 | 320/107 |

(56) References Cited

U.S. PATENT DOCUMENTS

| | | | |
|---|---|---|---|
| 2014/0354219 A1* | 12/2014 | Fan | H02J 7/0044 320/108 |
| 2015/0008880 A1* | 1/2015 | Johnson | H02J 7/0044 320/111 |
| 2015/0015204 A1* | 1/2015 | Sorias | H02J 7/0044 320/111 |
| 2015/0263447 A1* | 9/2015 | Liao | H01R 27/02 361/601 |
| 2015/0326265 A1* | 11/2015 | Yang | H02J 7/02 455/573 |
| 2016/0141815 A1* | 5/2016 | Warren | H01R 13/60 439/529 |
| 2016/0204816 A1* | 7/2016 | Abramovich | H04B 1/3888 455/575.8 |
| 2016/0266609 A1* | 9/2016 | McCracken | H04R 5/04 |
| 2017/0214263 A1* | 7/2017 | Fathollahi | H02J 7/0044 |

* cited by examiner

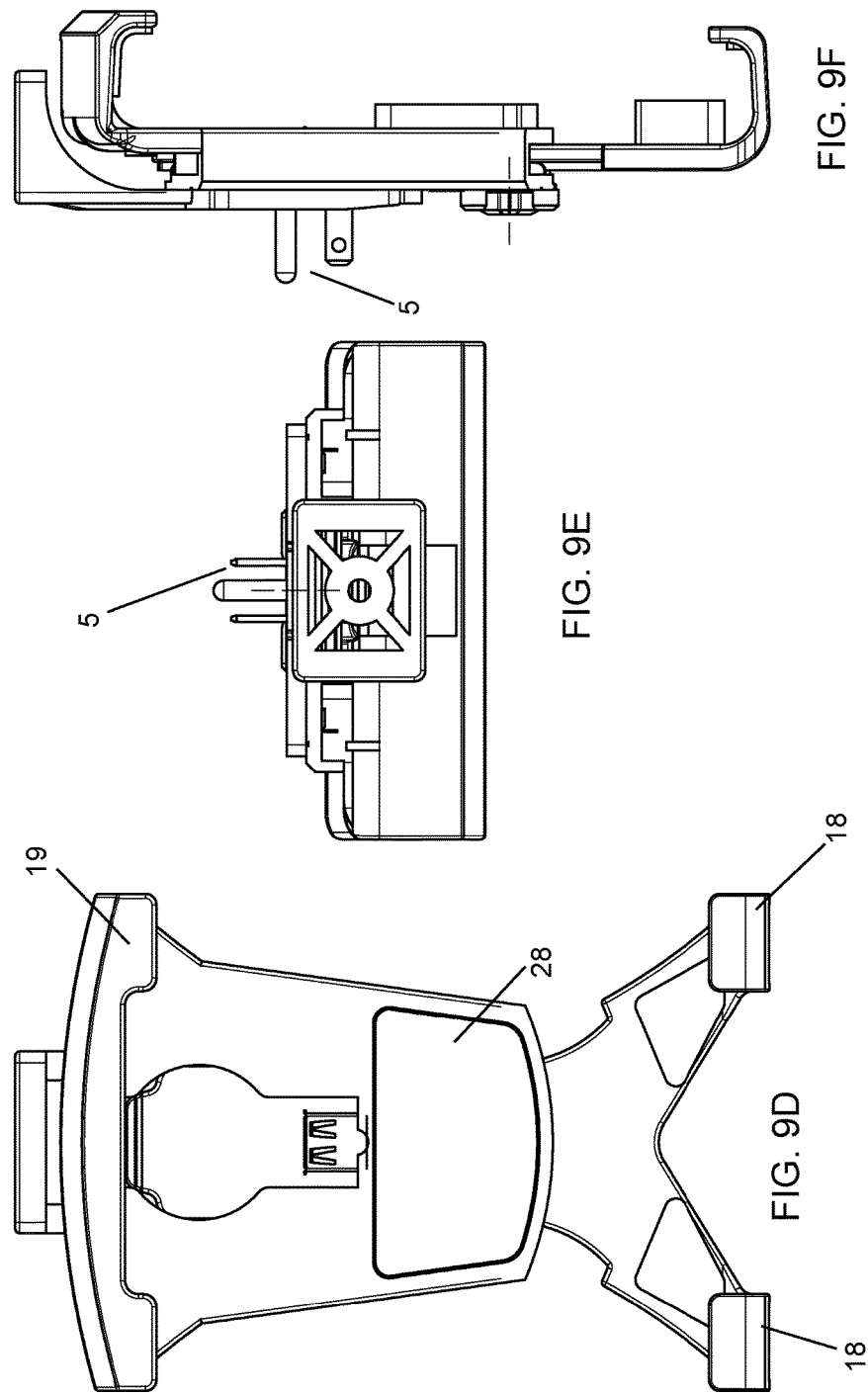

MOUNT FOR A TOUCH-SCREEN DEVICE

BACKGROUND OF THE INVENTION

Field of the Invention

The invention relates to a mount for a touch-screen device, such as a tablet computer, to be disposed at an existing electrical wall outlet.

Description of the Related Art

U.S. Patent Application Publication US 2013/0241489, U.S. Patent Application Publication US 2008/0157715, U.S. Pat. No. 9,551,454, U.S. Pat. No. 8,864,517, U.S. Pat. No. 8,686,683, U.S. Pat. No. 8,415,920 and U.S. Pat. No. 6,034,505 all disclose charging mounts which are plugged into an electrical wall outlet and have a cradle for a small electronic device, such as a cellular telephone. Some of the devices are rotatable to accommodate wall outlets having different orientations, but the electronic device can only be placed above the cradle and thus are held by gravity. That is because the electronic devices are intended to be removed once they are charged. U.S. Patent Application Publication US 2012/0139484 similarly discloses a charging shelf which, however, is used for wireless charging. U.S. Pat. No. 9,153,986 covers an existing electrical outlet and provides two other electrical outlets as well as a charging station on which a removable pod module is placed. U.S. Pat. No. 8,868,939 discloses a portable power supply device.

However, none of the prior art devices provides a mount which is connected to and covers an existing electrical wall outlet, can connect to a USB port of a touch-screen device, permanently connects and continuously charges the touch-screen device and permits the touch-screen device of any size to be rotated.

BRIEF SUMMARY OF THE INVENTION

It is accordingly an object of the invention to provide a mount for a touch-screen device, which overcomes the hereinafore-mentioned disadvantages of the heretofore-known mounts of this general type, which can be used to rotatably mount any size touch-screen device, which covers an existing electrical wall outlet and which continuously connects and powers the touch-screen device.

With the foregoing and other objects in view there is provided, in accordance with the invention, a mount for mounting a touch screen device, such as a tablet computer, to an electrical outlet. The mount comprises a base for rotatably mounting the touch screen device to the electrical outlet, especially a wall outlet, an electrical plug to be plugged into the electrical outlet, a USB plug to be plugged into a port of the touch screen device, and a cover for covering at least edges of the touch screen device. The base and the cover hide the electrical outlet. The mount can be used to rotatably mount any size touch-screen device, it covers an existing electrical wall outlet and it continuously connects and powers the touch-screen device.

In accordance with another feature of the invention, a converter is connected to the electrical plug and a cable is connected between the converter and the USB plug. Therefore, as long as the mount is in place, the touch screen device will remain charged.

In accordance with a further feature of the invention, a plate has one side on which the electrical plug is disposed and another side on which conductors are disposed for connecting the electrical plug to the converter. The plate, the converter and the conductors provide a slim interconnection between the plug and the port of the touch screen device.

In accordance with an added feature of the invention, a tab covers the conductors in order to protect and insulate the conductors.

In accordance with an additional feature of the invention, a rotating head is disposed between the base and the touch screen device for permitting the touch screen device to be rotated into a horizontal or a vertical position. Therefore, the touch screen device can be easily rotated for portrait or landscape viewing.

In accordance with a further feature of the invention, stops or clamps are attached to the base for gripping edges of the touch screen device. At least some of the stops or clamps are adjustable for gripping edges of differently-sized touch screen devices. More specifically, a slide is provided on which the adjustable stops or clamps are mounted. The base has a slot for receiving the slide and a screw to be tightened for squeezing sides of the slot against the slide and fixing the adjustable stops or clamps in a desired position for gripping the edges the touch screen device. The slide may have a knurled surface to ensure secure gripping in the slot. Instead of providing three or four individual stops or clamps, two adjustable stops or clamps are provided for holding corners of the touch screen device and one fixed stop or clamp is provided for holding an edge of the touch screen device opposite the corners, which provides sufficient gripping.

In accordance with a concomitant feature of the invention, a prong or screw is provided for insertion into a threaded hole of the electrical wall outlet after removing a screw holding a face plate on the electrical wall outlet. This prevents the mount itself from rotating on the wall outlet and holds the mount securely in place.

Other features which are considered as characteristic for the invention are set forth in the appended claims.

Although the invention is illustrated and described herein as embodied in a mount for a touch screen device, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE SEVERAL VIEWS OF THE DRAWING

FIG. 9A-FIG. 9I are views of an embodiment of the mount which is adjustable for different size touch screen devices.

DETAILED DESCRIPTION OF THE INVENTION

Figure 1:
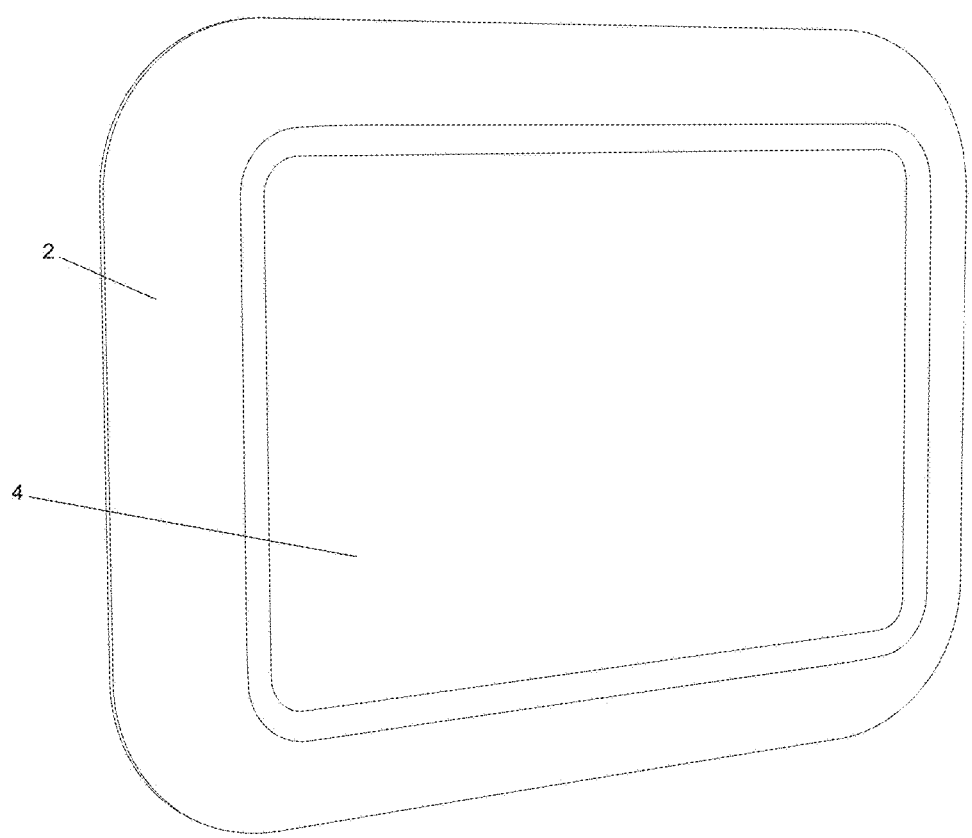
FIGS. 1 and 2 are different diagrammatic, front-perspective views of a cover of the mount of the invention covering the edges of a touch screen device.
Figure 2:
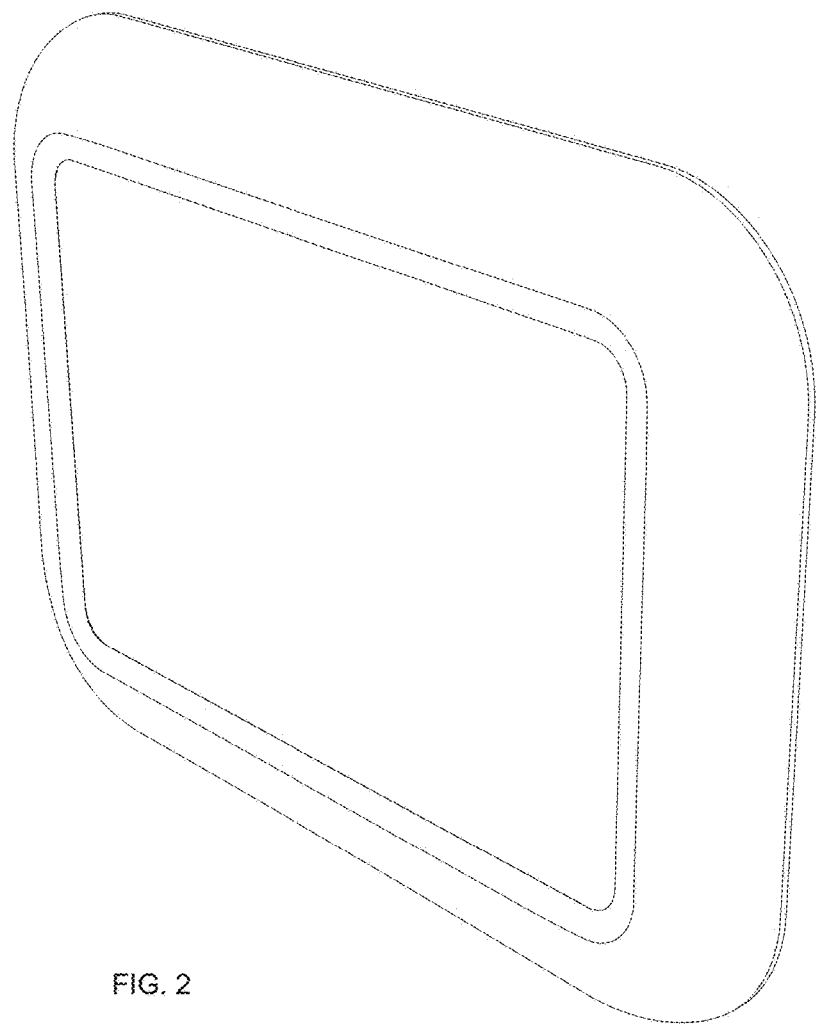
Figure 3:
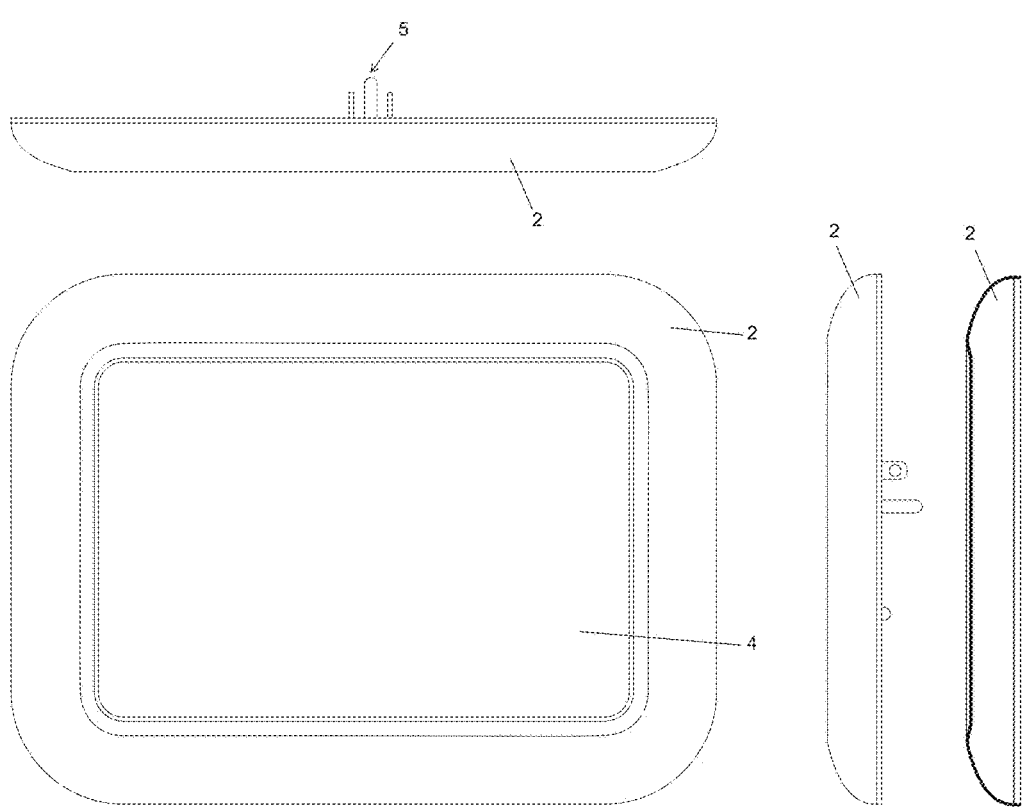
FIG. 3 includes front-elevational, side-elevational, top-plan and bottom-plan views of the cover of the mount.

Referring now to the figures of the drawing in detail and first, particularly, to FIGS. 1-3 thereof, there is seen a mount for a touch-screen device, such as a tablet computer, for instance an iPad. The mount is preferably made of molded plastic or metal and includes a cover 2 in the form of a rectangular frame which is placed over the edges of a tablet computer 4 so as to be flush with a wall having an existing electrical outlet and so that only the cover 2 and the tablet computer 4 can be seen at the location of the electrical wall outlet. A rotatable plug 5 of the mount has prongs to be plugged into the wall outlet. A prong or screw 6 is inserted into a threaded hole of the electrical wall outlet after removing a screw which holds a face plate on the electrical wall outlet. When the plug 5 is plugged into an electrical outlet, the mount is held by the outlet itself. Therefore, installation of the mount does not require any actual wall mounting which might involve cutting and patching the wall and using screws or other fasteners.

The wall outlet may be disposed well above the floor, such as in a kitchen, so that the touch-screen device can be easily viewed from a standing or sitting position. However, it can also be an outlet disposed at any other location, such as near the floor for images or voice directed to pets.

Figure 4:
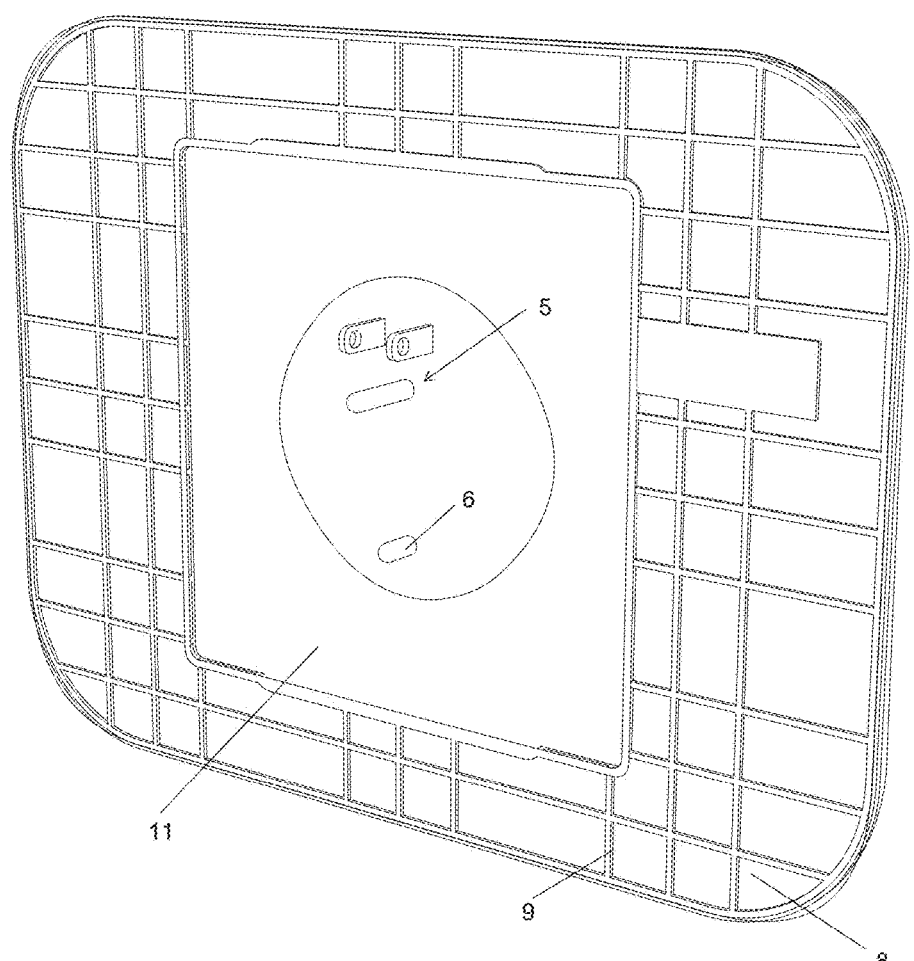
FIGS. 4 and 5 are rear-perspective and rear-elevational views showing the base of the mount.
Figure 5:
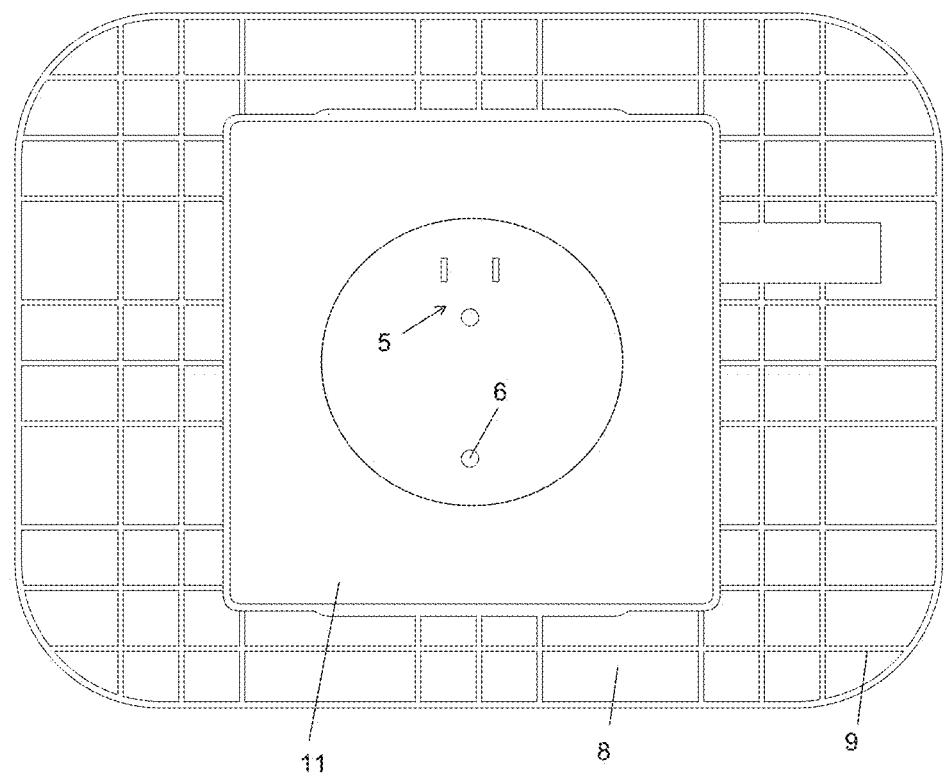

FIGS. 4 and 5 show a base 8 of the tablet mount having ribs 9 which strengthen the base and a plate 11 on which the prongs are mounted. The cover 2 is snapped onto the edges of the base 8 with the tablet computer 4 clamped therebetween. It can also be seen from FIGS. 4 and 5 that the back of the mount provides adequate spacing to entirely cover the electrical wall outlet when the screw 6 is used to secure the mount to the electrical wall outlet. Therefore, the mount gives the illusion of a permanent mounting.

Figure 6:
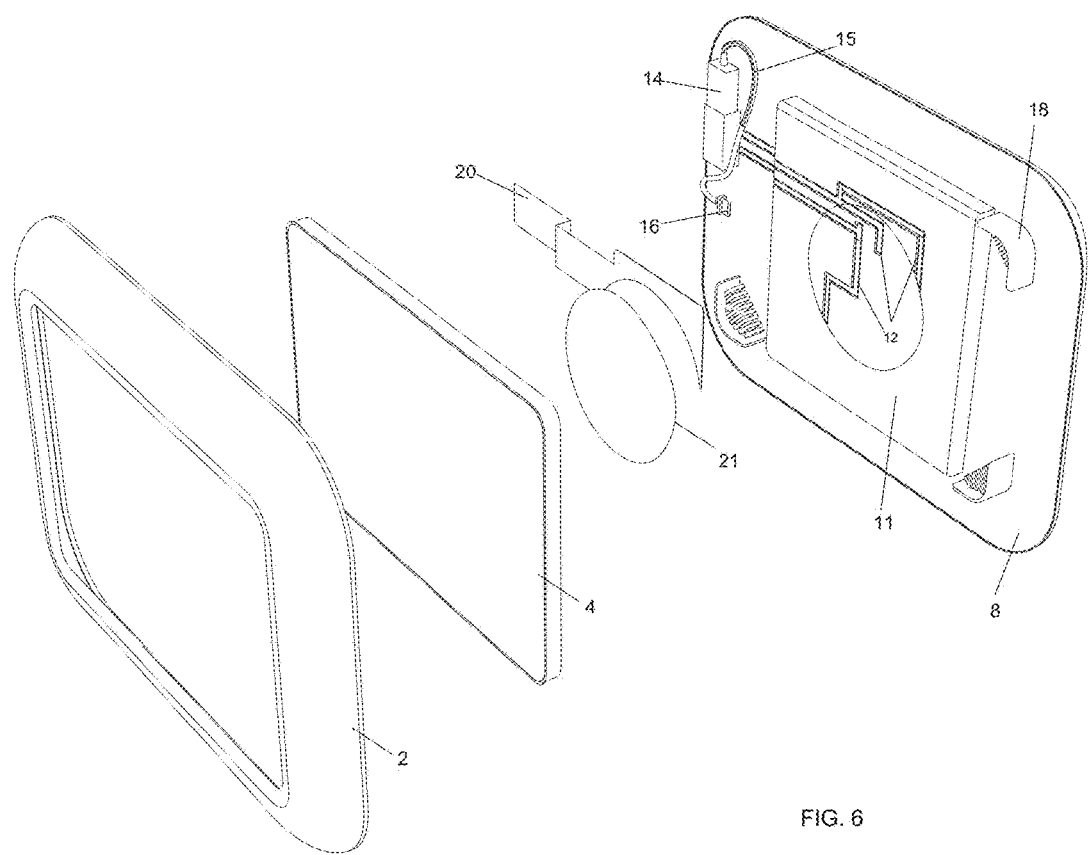
FIG. 6 is an exploded, perspective view of the mount and a touch-screen device.
Figure 7:
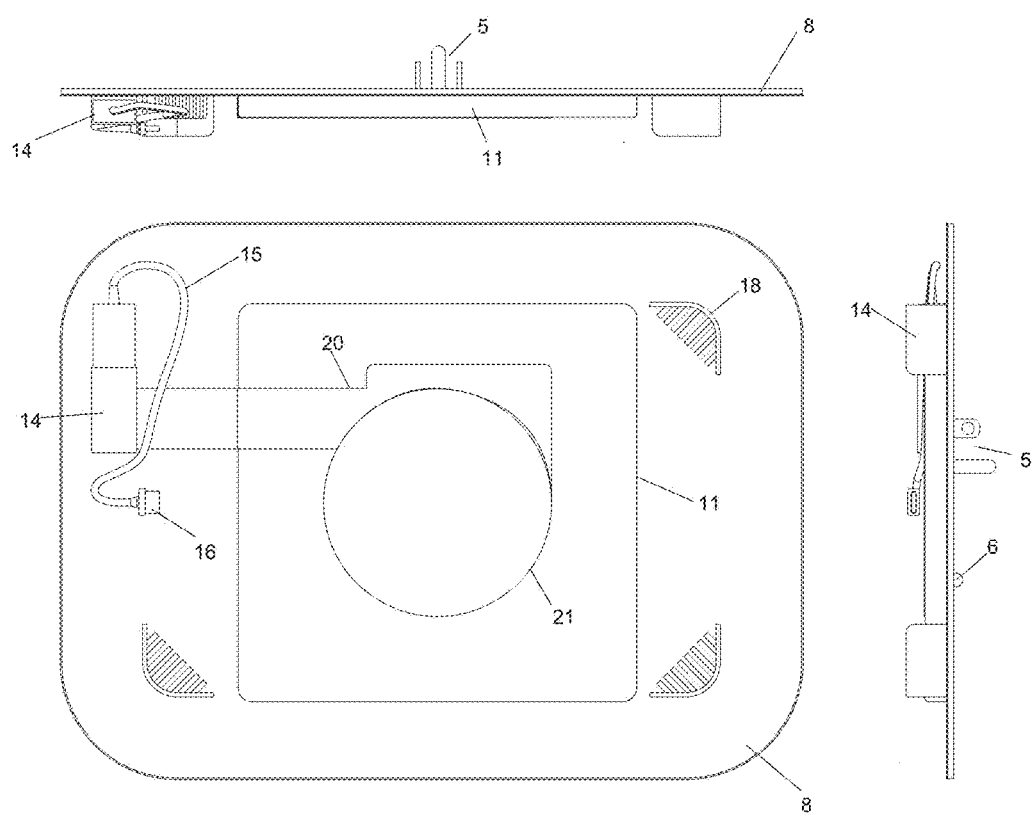
FIG. 7 includes rear-elevational, side-elevational and top-plan views of the mount without the touch screen device and the cover.
Figure 8:
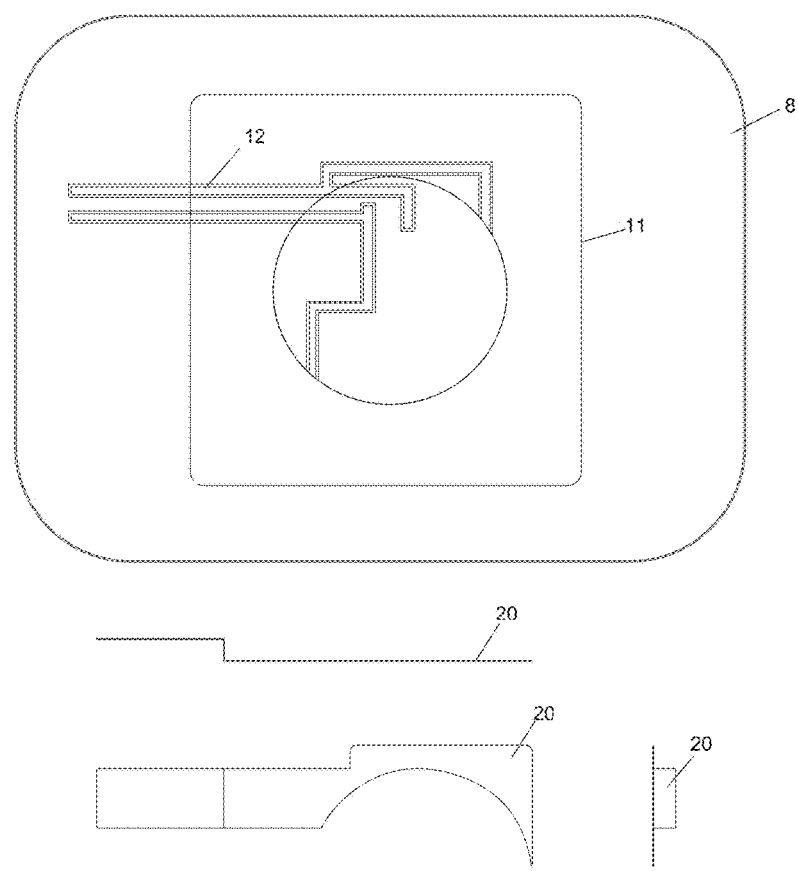
FIG. 8 is an exploded, rear-elevational view of internal parts of the mount showing AC power leads or conductors.

The exploded, perspective view of FIG. 6 shows the cover 2, the touch-screen tablet computer 4 and the base 8. The plate 11 is seen from the opposite side shown in FIGS. 4 and 5 and therefore instead of the plug 5, conductors or AC power leads 12 can be seen which lead from the plug 5 to a converter 14 having a cable 15 and a USB plug 16 to be plugged into the tablet computer 4 in order to permanently power the tablet computer 4 from the wall outlet. Three corner stops or clamps 18 are mounted on the back of the base 8 for engaging three of the corners of the tablet computer 4. FIGS. 9A-9I, which show an embodiment of the tablet mount in which the corner stops or clamps 18 are adjustable for different size tablet computers, will be explained below. Finally, FIG. 6 shows a tab 20 for covering the conductors 12 and a rotating head 20 for permitting the tablet computer 4 to be rotated into a horizontal (landscape) or a vertical (portrait) position. FIG. 7 shows the elements of FIG. 6 in an assembled state. In FIG. 8 several elements have been removed in order to show the tab 20 in greater detail.

Figure 9C:
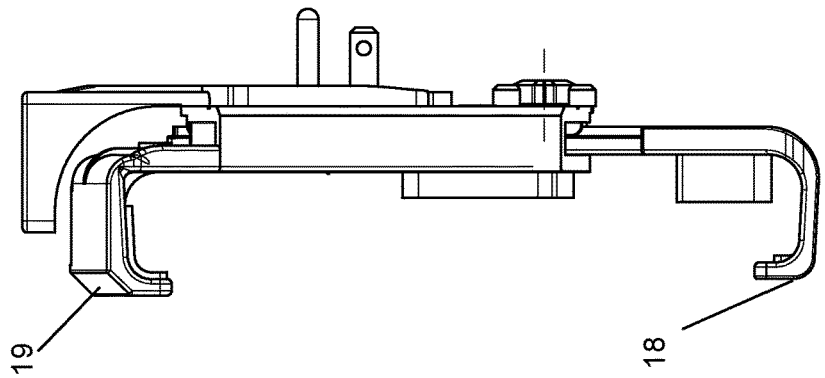
Figure 9B:
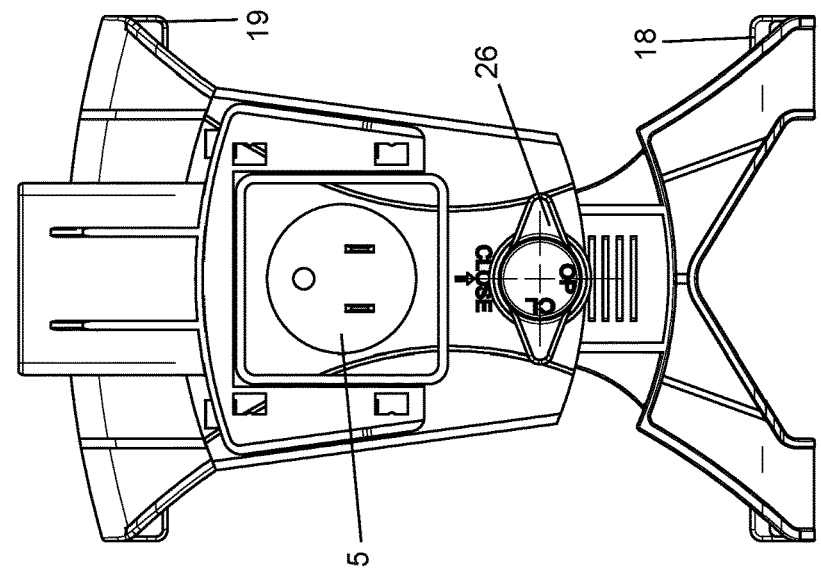
Figure 9A:
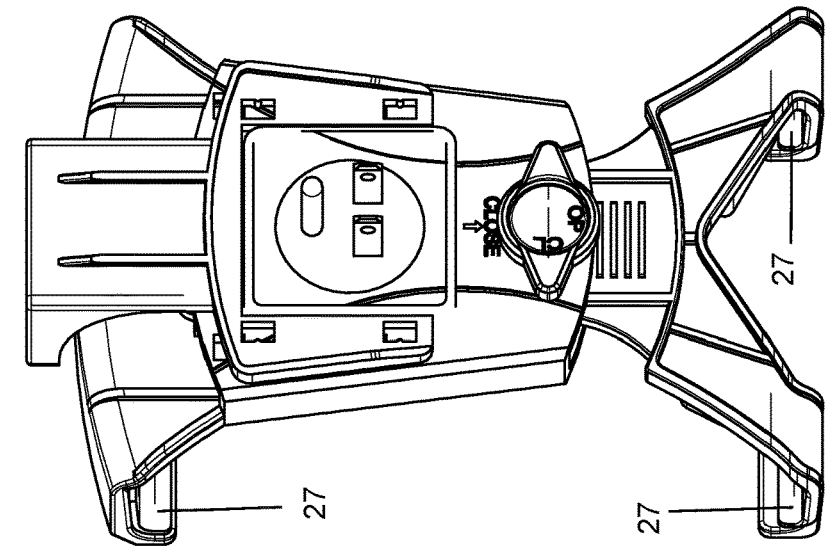
Figure 9I:
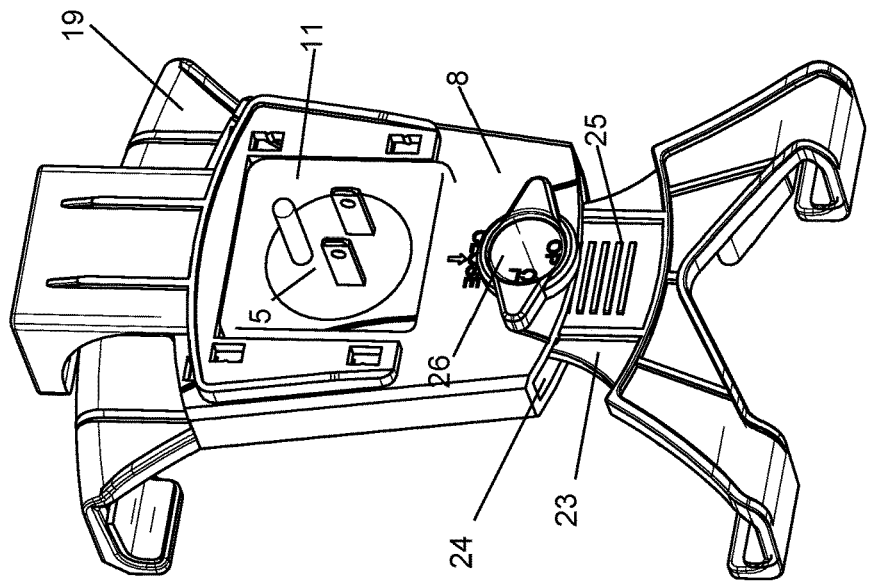
Figure 9H:
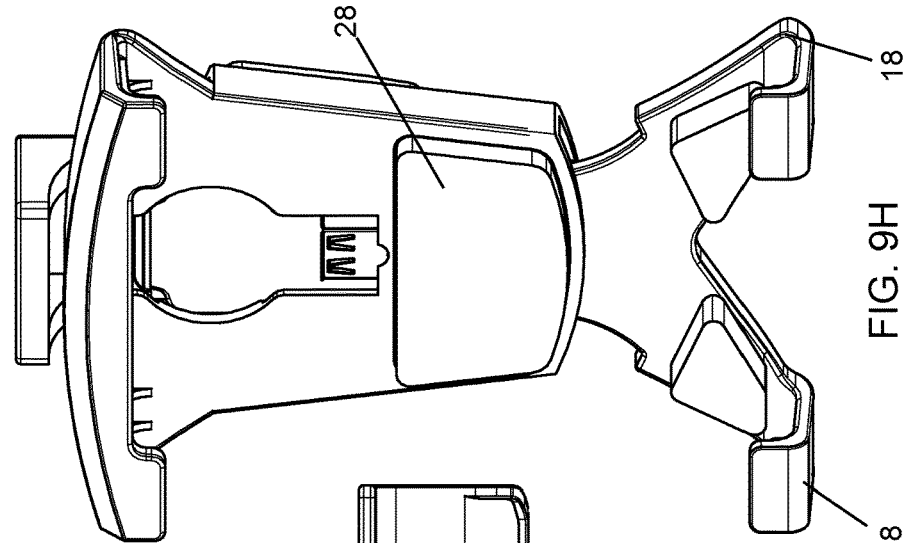
Figure 9G:
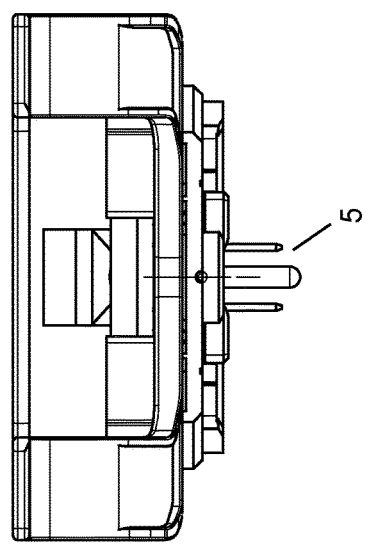

As mentioned above, FIGS. 9A-9I show an embodiment of the tablet mount in which the corner stops or clamps 18 are adjustable for different size tablet computers. In this case, two individual corner stops or clamps 18 and one elongated stop or clamp 19 are provided for gripping the tablet computer. FIG. 9I, in particular, shows a tripod-shaped slide 23 to which the corner stops or clamps 18 are attached.

The base 8 has a slot 24 receiving the slide 23 so that a locking screw 26 can be tightened for squeezing and locking the sides of the slot against a knurled surface 25 of the slide and thus fixing the stops or clamps 18, 19 in a desired position for gripping the edges of a tablet computer of any size. The locking screw has indications for close and OP and CL as abbreviations for open and closed, respectively, as shown in FIG. 9B. The stops or clamps 18, 19 each have a sponge or pad 27 and the base 8 has a sponge or pad 28 acting as cushions for the tablet computer 4. A USB connector 29 can also be seen.

Figure 10:
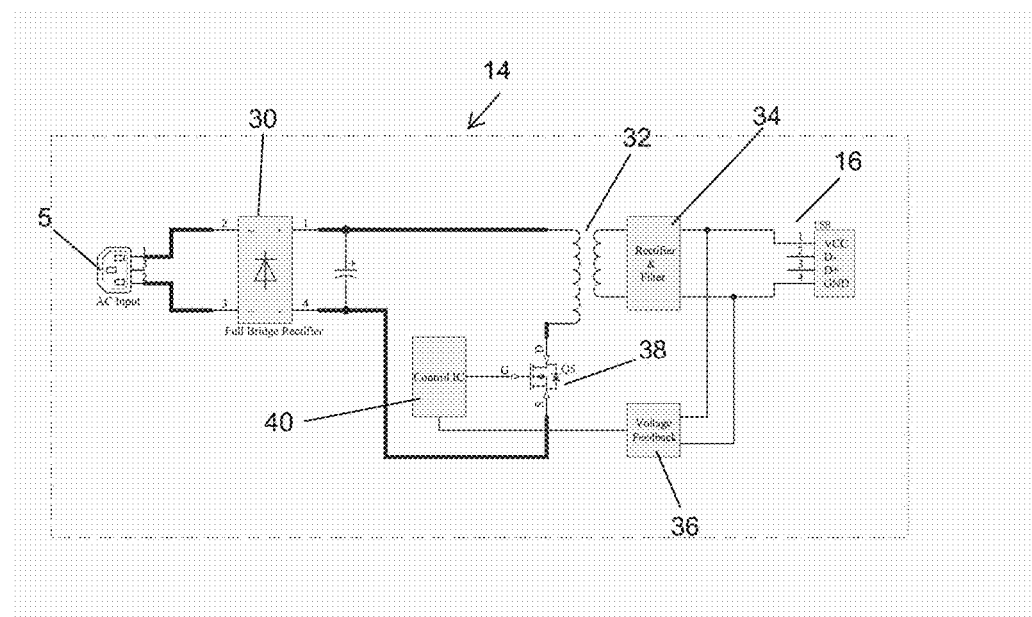
FIG. 10 is a schematic circuit diagram of the converter of the mount.

FIG. 10 is a schematic circuit diagram of the converter 14 of the tablet mount. The plug 5 receives an AC input from the wall outlet and the USB plug 16 is provided to be plugged into the USB port of the tablet computer 4. More specifically, the plug 5 is connected to a full bridge rectifier 30 which, in turn, is connected through a transformer 32 and a rectifier and filter 34 to the USB plug 16. Voltage feedback 36 is directed from an output of the rectifier and filter 34 to an IC controller 40 which verifies that the output voltage is in a proper voltage range. In order to adjust the voltage range, the IC controller 40 will drive a Q5 diode-connected transistor 38 at its gate terminal G as necessary for adjusting the output voltage so as to maintain the proper output voltage level.

The invention claimed is:

1. A mount for mounting a touch screen device to an electrical outlet, the mount comprising:
   a base for rotatably mounting the touch screen device to the electrical outlet;
   an electrical plug to be plugged into the electrical outlet;
   a USB plug to be plugged into a port of the touch screen device;
   a converter;
   a cable connected between said converter and said USB plug;
   a plate having one side on which said electrical plug is disposed and another side on which conductors are disposed for connecting said electrical plug to said converter; and
   a cover for covering at least edges of the touch screen device;
   said base and said cover hiding the electrical outlet.

2. The mount according to claim 1, wherein the touch screen device is a tablet computer.

3. The mount according to claim 1, wherein the electrical outlet is a wall outlet.

4. The mount according to claim 1, which further comprises a tab for covering said conductors.

5. The mount according to claim 1, which further comprises a rotating head disposed between said base and the touch screen device for permitting the touch screen device to be rotated into a horizontal or a vertical position.

6. The mount according to claim 1, which further comprises stops or clamps attached to said base for gripping edges of the touch screen device.

7. A mount for mounting a touch screen device to an electrical outlet, the mount comprising:
   a base for rotatably mounting the touch screen device to the electrical outlet;
   an electrical plug to be plugged into the electrical outlet;
   a USB plug to be plugged into a port of the touch screen device;
   a prong or screw to be inserted into a threaded hole of the electrical wall outlet after removing a screw holding a face plate on the electrical wall outlet; and a cover for covering at least edges of the touch screen device;

said base and said cover hiding the electrical outlet.

* * * * *